United States Patent
Neumann et al.

(10) Patent No.: US 7,399,718 B2
(45) Date of Patent: Jul. 15, 2008

(54) WATER-REPELLENT AND VAPOR-PERMEABLE MULTILAYER MATERIAL FOR OUTDOOR APPLICATIONS

(75) Inventors: Gert Neumann, Berlin (DE); Friedrich Raether, Hoechberg (DE); Holger Boese, Wuerzburg (DE); Peter Loeschke, Fichtenberg (DE); Volker Thole, Braunschweig (DE); Johann W. Herlyn, Braunschweig (DE); Heinz Sattler, Braunschweig (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 75 days.

(21) Appl. No.: 10/468,565

(22) PCT Filed: Feb. 22, 2002

(86) PCT No.: PCT/EP02/02028

§ 371 (c)(1),
(2), (4) Date: Aug. 21, 2003

(87) PCT Pub. No.: WO02/068184

PCT Pub. Date: Sep. 6, 2002

(65) Prior Publication Data

US 2004/0072487 A1    Apr. 15, 2004

(30) Foreign Application Priority Data

Feb. 26, 2001 (DE) ................................ 101 09 264
Feb. 22, 2002 (EP) ................................ 02003979

(51) Int. Cl.
*B32B 27/04* (2006.01)
*B32B 27/12* (2006.01)
*B32B 5/02* (2006.01)
*D04H 1/00* (2006.01)
*D04H 13/00* (2006.01)
*D04H 5/00* (2006.01)

(52) U.S. Cl. .................. 442/79; 442/63; 442/76; 442/86; 442/221; 442/226; 442/279; 442/381; 442/386; 442/414; 442/417

(58) Field of Classification Search .......... 442/381, 442/386, 414, 417, 76, 79, 221, 226, 279, 442/63, 86
See application file for complete search history.

(56) References Cited

U.S. PATENT DOCUMENTS

| | | | |
|---|---|---|---|
| 4,647,496 A | 3/1987 | Lehnert et al. | |
| 4,879,173 A | 11/1989 | Randall | |
| 4,882,888 A | 11/1989 | Moore | |
| 4,948,647 A | 8/1990 | Burkard | |
| 5,397,631 A | 3/1995 | Green et al. | |
| 5,900,298 A * | 5/1999 | Syme et al. ................ 428/68 |

FOREIGN PATENT DOCUMENTS

| | | |
|---|---|---|
| DE | 28 08 723 A1 | 9/1979 |
| DE | 31 13 682 A1 | 10/1982 |
| DE | 34 08 932 A1 | 9/1985 |
| DE | 35 08 933 C2 | 4/1990 |
| DE | 39 37 429 A1 | 5/1991 |
| DE | 39 37 433 A1 | 5/1991 |
| DE | 195 06 398 A1 | 8/1996 |
| DE | 195 27 857 C2 | 10/1996 |
| DE | 195 27 858 C2 | 3/1998 |
| WO | WO 96/40514 A1 | 12/1996 |

OTHER PUBLICATIONS

Joseph Davidovits, "Geopolymers: Man-Made Rock Geosynthesis and the Resulting Development of Very Early High Strength Cement", J. Materials Education, 1994, pp. 3-27, vol. 16. Nos. 2 and 3.
Joseph Davidovits, "Properties of Geopolymer Cement", Alkaline Cements and Concretes, 1994, Geopolymer Institute, pp. 1-19, Kiev Ukraine.

* cited by examiner

*Primary Examiner*—Norca Torres-Velazquez
(74) *Attorney, Agent, or Firm*—Arent Fox LLP

(57) ABSTRACT

The invention relates to a multilayer material comprising (a) a first layer that consists of plaster or that substantially consists of plaster, and (b) at least one second layer, comprising a sandwich textile fiber material. The fibers of said material are interlinked in a mechanically stable manner, are incombustible and weather-proof and the interspaces are filled with a finely porous material. The second layer has a diffusion-equivalent air layer thickness of not more than 2.0 m and is water-impermeable at a water pressure of at least 100 mm water column. The inventive material can be used outdoors due to its properties. The invention further relates to methods for producing such a material.

5 Claims, No Drawings

WATER-REPELLENT AND VAPOR-PERMEABLE MULTILAYER MATERIAL FOR OUTDOOR APPLICATIONS

This application is a 371 of PCT/EP02/02028 filed on Feb. 25, 2002, the entirety of which is hereby incorporated by reference.

This invention relates to a multilayer, preferably sheet-like material with a gypsum core for outdoor applications which is coated at least on one side such that it has water-repellant properties at least on this side, but remains vapor-permeable. The material is suitable for outdoor use, for example weather-resistant use in building construction.

Gypsum has very favorable material properties which make it attractive for construction applications. This includes natural moisture equalization with the environment, a low water vapor permeation resistance, good fire resistance behavior, no emission of toxic substances, a low specific weight and low production costs. One decisive disadvantage is the poor resistance to water, since gypsum has relatively high solubility in water. Even if there is only the danger of longer moisture absorption of plasterboard, use of gypsum materials is not allowable. Gypsum tends under these conditions to creep deformation, and irreversible damage to the gypsum structure occurs, which is also called rotting. For this reason structural panels for outdoors which consist mainly of gypsum and are directly exposed to the weather have not been known to date.

Various forms of plasterboard for interior applications are available on the market. Gypsum plaster board is especially widely used. The gypsum core sheet is lined on both sides with a cardboard layer. One disadvantage of the gypsum plaster board is the high flammability of the cardboard, another is low water resistance. In order to achieve a greater fireproof character, DE OS 28 08 723 proposed a plasterboard which is lined with a glass fiber veil. Inorganic particles can be mixed into the binder of the glass fiber veil, which binder holds the fibers of the veil together. Thus DE 31 13 682 A1 describes the use of certain inorganic hydroxides in the binder to cause chemical bridge formation when thin plaster which has been applied in liquid form sets, by which bridge formation the strength of the connection between the jacket and the gypsum core is improved. The additive moreover improves the fireproof property of the plasterboard. DE 35 06 933 A1 proposes placing on one side of the gypsum core a glass fiber veil which is coated on its outside with an artificial resin adhesive such that the coating can be used as reinforcement against wear. For purposes of fireproofing, discrete inorganic particles are mixed into the organic binder, also improved air and vapor permeability being achieved. A veil with a similar structure is also described by DE 34 08 932 A1. It is coated on one side with an inorganic powdered material and a binder, its having to be watched that the open structure of the veil is preserved on the side facing away from the coating in order to ensure good anchoring of the veil to the plasterboard. Patents DE 195 27 857 and DE 195 27 858 proposed providing the glass fiber veil with an inorganic coating consisting essentially of calcium sulfate and containing an organic binder and optionally other additives for production engineering reasons and to increase the adhesive strength between the plasterboard and veil. One-sided coatings of the glass fiber veil are also proposed more often to avoid the flow of the thin plaster through the veil and the associated fouling of the conveyor belt in the subsequent production of the gypsum core sheet (see for example DE 39 37 433 A1).

The plasterboard which is proposed by manufacturers for outside applications includes products which may not be exposed either to direct rainwater and which therefore require external protection (for example, heat insulating composite systems), or the structural panel consists of gypsum only to a relatively small proportion. In the former case the use of plasterboard is associated with a relatively high cost. Conversely, in the latter case it is not a plasterboard in the sense of this application, since a considerable or even predominant proportion consists for example of cement (see DE 39 37 429 A1).

In addition, waterproofing agents are known which can be added to a gypsum mass before setting (mass waterproofing) or are applied later to the hardened product (surface waterproofing). In this way gypsum plasterboard can be produced which is suitable for use in wet spaces as well. The action of this protective measure is however not sufficient to allow the plasterboard to be used outdoors, where it is exposed to heavy precipitation in direct contact.

The object of this invention is to make available a plasterboard for outdoor application which can be directly exposed to weather, but does not prevent moisture equalization of the gypsum and the bordering components which are present under certain circumstances.

In achieving the object a multilayer material with a gypsum core sheet is made available which is provided on one side (which is intended as the outside) or on the two sides with a protective layer which is permeable to water vapor and thus further enables the moisture equalization of gypsum, but on the other hand keeps liquid water from coming into contact with the gypsum and has improved airtightness. This water-repelling and vapor-permeable protective layer comprises a textile fabric of mechanically stable fibers which are not flammable and are weather-resistant, in combination with a water-insoluble material which has fine pores, which is located within the fiber layer and fills its intermediate spaces such that the protective layer is pressure-tight for liquid water of at least 100 mm water column, water vapor conversely is allowed to pass as a result of a favorable, diffusion-equivalent air layer thickness of distinctly less than 2.0 m, especially of less than 1.0 m, and is water-insoluble at least on its outer side.

The fiber material for the textile fabric is not limited if it has the necessary properties. Inorganic fibers such as for example glass fibers or mineral, especially ceramic fibers, are well suited. The structure of the fabric is not critical if the fibers are mechanically stably joined to one another. Thus textiles, woven fabric, knit, nonwovens or the like can be used. The fibers can be fixed among one another using a binder, which preferably, but not necessarily, is an organic binder. A well suited binder material is melamine resin. A textile fiber material which is especially preferred as claimed in the invention is a glass fiber veil especially of E glass, with fibers which have been fixed with melamine resin. These materials have good weather resistance.

Because the textile fiber material is filled with a fine material which has open pores, the second layer of the multilayer material remains permeable (diffusion-open) to gaseous water. This is because the permeability of gases is dependent solely on the presence of pores and their size, but not on the chemical properties of the material which forms these pores. It is different with the permeability to liquid water: this is determined not only by the pore size, but also by the hydrophilia/water repellency of the material. A criterion which is necessary for the invention is therefore naturally that the material should not have coarse cracks or holes through which liquid water could penetrate into the board even if the material used were relatively water-repellent. This is achieved in that the fiber material is filled with a material which has fine pores. This coating cannot be achieved solely by coating with a pasty mass, for which reason it is a good idea to precipitate a polymer directly in the fiber material or to impregnate the fiber material with a dissolved or dispersed/suspended polymer or its precursors, then to remove the solvent and optionally induce cross-linking of the material.

As mentioned above, the property of the second layer to be water-repellent or to prevent the passage of water is determined not only by the pore sizes, but also and mainly by the water repellency of the material which has fine pores. Water-repellent materials as have been used in the past to coat glass fiber veils, and which are described for example in the aforementioned documents DE 34 08 932 A1 and DE 35 08 933 A1, are therefore not suited for this invention even if they have pores and thus have a certain air permeability. These materials are inorganic materials such as calcium carbonate, aluminum hydroxide and oxide hydrates, perlites, limestone, gypsum, or vermiculite or the like. They are not only all hydrophilic, but also partially even hygroscopic.

The expression "material which has fine pores" as claimed in the invention is defined as a material with pores of dimensions such that the passage of liquid water is prevented, the passage of gaseous water, therefore water vapor, is however possible. Since these properties are dependent not only on the dimensions of the pores as such but also on the properties of the pore-forming material, especially its hydrophilia or water-repellency, the pores of water repellent material can be larger than those of more hydrophilic material without losing the desired effect. Accordingly the expression "fine pores" should encompass pores with pore sizes from the nm to micron range if the material surrounding them is water-repellent enough to prevent the passage of water. This water repellency can be determined for example by the edge angle of a water droplet which rests on the material to be determined. For this invention especially those materials are suitable on which a water droplet stands with an edge angle from 80° to 140°, preferably from 95° to 130°.

The material which forms the fine pores can be an inorganic, an organic or an inorganic-organic polymer material or can be formed on the basis of mixtures of these materials. Polymers which are suited for this invention are essentially insoluble in water, but still have sufficient water repellency to form a coherent, fine-porous layer in the presence of water. Another desired criterion is sufficient UV stability so that aromatic compounds can be used only conditionally, i.e. with the corresponding stabilization. Preferably the organic polymers can accordingly include oxygen-containing materials, for example polymers which contain ester groups such as polyesters, cellulose esters and derivatives of starch, copolymers with vinyl acetate such as ethylene-vinyl acetate copolymers (EVA), but also for example polyurethanes of aliphatic or cycloaliphatic diisocyantes. Acid group-containing copolymers such as copolymers based on maleic acid or acrylic or methacrylic acid are examples of these oxygen-containing polymers with hydrophilic properties. Furthermore, cross-linked polymers which are present first as oligomers during application and crosslink and become insoluble in water only after layer formation can be used as a material which forms fine pores.

Inorganic-organic or also purely inorganic materials can be used. One example is water glass which is chemically hardened for example using multivalent cations or phosphates, especially aluminum phosphate. By chemical hardening it achieves high water resistance. Inorganic polymers furthermore include the so-called geopolymers. i.e. mostly amorphous to semicrystalline, three-dimensional silicon aluminates which can be produced by so-called geosynthesis, i.e. at temperatures below conventional sintering temperatures, generally distinctly below 450° C. They can be obtained for example from surfactant fillers, so-called phyllosilicates (kaolinite, montmorillonite, halloysite) with concentrated sodium hydroxide solution or water glass and can contain 8 and/or 12 membered-rings of Si, Al, and O. These geopolymers are described for example in detail in the "Journal of Materials Education", V. 16 (283), pp. 91-139 (1994) or in *Alkaline Cements and Concretes,* KIEV, Ukraine, 1994. Properties of Geopolymer Cements. Since it part they harden even below 100° C. (set, condense), they are also called cold setting ceramics.

Both water glass and also the geopolymers can be made water repellent if necessary, for example subjected to mass waterproofing.

It is an especially good idea to use a mixture of organic and inorganic material.

There is a series of various possibilities for filling the textile fiber materials with a material which forms fine pores. Processes are especially favorable by which the fine-porous material in the fiber nonwoven or the fiber mat is precipitated, or processes in which the nonwoven or the mat is impregnated with a solution, suspension or dispersion from which the fine-porous material is formed or remains after removing the solvent.

In one embodiment of the invention, accordingly a fine-porous structure is produced in the flat, textile fabric in that the fiber layer is immersed in a solution of a polymer which is soluble in an organic solvent. After removing the fiber layer from the solution it is dried for a certain time in air and then dipped into a solvent, for example a water bath, in which the polymer is not soluble and therefore precipitates. In doing so a fine-porous layer forms in the fiber layer. The process can optionally be repeated until sufficient filling is achieved (i.e. there are no longer any large holes or pores in the fiber layer). After removal from the water bath the filler fiber layer is completely dried. The fine-porous layer produced in the fabric has a water-repellent effect with a suitable selection of the polymer with simultaneous permeability to water vapor. The water-repelling action can be recognized in that a water droplet on the fiber surface does not penetrate into the layer, but forms a clear edge angle.

Polymer materials which can be used to form a fine-porous structure in the textile fiber material layer using this process are for example cellulose propionate, cellulose butyrate and copolymers of ethylene and vinyl acetate. In the ethylene-vinyl acetate copolymer the solubility in the solvent (acetone is suitable) depends on the proportional ratio of the two monomers. A mass ratio of the two monomers of 20:80 or of 40:60 can be used. With an ethylene-vinyl acetate copolymer with a mass ratio of 20:80 a fine-porous layer can be produced in a glass fiber veil which prevents penetration of water at a water height of 150 mm.

In another embodiment of the invention a fine-porous structure in the textile fiber material layer is produced by the layer being immersed once or optionally several times in a polymer dispersion and being dried after it is removed. The polymer dispersion consists for example of small polymer particles (dispersed phase) in water (continuous phase). In the production of a fine-porous layer in the fiber layer film-like structures form between the fibers and prevent passage of water. One example of production of a fine-porous layer using this procedure is use of an aqueous acrylate dispersion. A glass fiber veil filled in this way with an acrylate dispersion could prevent a water column with a height of more than 400 mm from passing through the veil.

In another embodiment of the invention the textile fiber layer is treated with a solution or suspension of an inorganic material. Solutions of water glass and/or one of the aforementioned geopolymers are especially suited for this purpose. Geopolymers can be subjected to a condensation reaction at relatively low temperatures after impregnating the fiber material with a solution which contains the corresponding starting materials, for which reason they are especially well suited for this invention. In part, the setting takes place even at room temperature and at least at such mild temperatures that the binder which may be contained in the textile fiber material is not damaged. When the geopolymer which is being used has not been subjected to prior mass waterproofing, it is preferred that its water repellency be increased later, for example it being made water repellent using surface silanization, in order to make the surface water-repellant.

The textile fiber material can be joined to the gypsum core by coating or in some other way. It is a good idea if the textile fiber material is first impregnated with the material which has or forms the fine pores and after setting or drying of this material the fiber material is placed on a base and is painted or otherwise coated with the thin plaster which optionally contains additives. When the gypsum sets an intimate bond of the plasterboard with the textile fiber material forms. Alternatively the textile fiber material can be joined mechanically, for example by clamping, to the already hardened plasterboard. Cementing is also possible, its having to be watched that a continuous cement layer is not produced which inhibits the passage of the water vapor.

The gypsum core sheet which acts as the carrier sheet has a matrix of gypsum (calcium sulfate dihydrate, $CaSO_4 \times 2H_2O$). The sheet can consist exclusively of gypsum, but generally also contains reinforcing particles (for example, fibers or chips), often also water-repelling agents and optionally other additives which are known to one skilled in the art. They include for example setting delaying agents, setting accelerators, substances which influence rheology, or pore agents. The gypsum proportion in the sheet is for example preferably 50-100% by weight, more preferably roughly 78-97% by weight, and especially preferably 80 and 93% by weight.

It is often desirable to provide the plasterboard with mass waterproofing based on silicones, paraffins, waxes, artificial resins or the like, as is known for use in wet spaces. Mass waterproofing is designed to prevent larger amounts of water from collecting on the inside of the textile fiber material and the gypsum structure from dissolving and being destroyed over time.

Especially economical mass waterproofing can be achieved by using solids (paraffin, wax, microcapsules) with a water-repellent effect. To do this, fine-particulate waterproofing agents can be added directly to the fresh mass of a settable calcium sulfate, and optionally to the reinforcing particles. In order to uniformly distribute the waterproofing agent in the matrix the material can be subjected to controlled heat treatment following the hardening of the calcium sulfate. In this heat treatment the solid waterproofing agent melts and the matrix is impregnated from the inside out. Heat treatment can take place in a continuous drier or by means of a high frequency or microwave treatment. Solid waterproofing agents are especially advantageous when liquid waterproofing agents adversely affect the hydration behavior of the calcium sulfate.

To increase strength, the plasterboard can also contain reinforcing particles, for example, fibers or chips, preferably in a proportion of 0.5-35% by weight, more preferably in a proportion of 1-30% by weight and especially preferably in a proportion of 5-25% by weight relative to the amount of gypsum-containing dry mass which is used to mix the thin plaster. The reinforcing particles can consist of organic or inorganic materials such as glass or cellulose or can contain these materials as the core. The chips or fibers can optionally be surface-modified to improve adhesion, for example by modification with silanes. Moreover the gypsum core sheet can be provided with lightweight fillers such as perlite or can be foamed using a pore forming agent such as for example the sodium salt of an olefin sulfonate (for example Hostapur OSB, Hoechst) in order to reduce the weight and to increase the thermal insulation capacity. The additives yield a moisture behavior such that the water vapor diffusion resistance decreases with increasing material moisture content so that a wet sheet dries out more quickly than one which is less wet and in another case a dry sheet absorbs moisture more slowly.

To produce the water-repellent property and vapor permeability the gypsum core sheet as claimed in the invention is combined as mentioned at least on one side with the textile fiber material, with intermediate spaces which are filled with a material which has fine pores. Here it must be watched that the respective production process takes place at temperatures which preclude damage to other components of the plasterboard. This means that when the material which has the fine pores is to be made as a filler material only in the textile fabric, this must take place at a low temperature such that no damage occurs to the materials which may already be contained in the fabric, such as organic binders.

With the described measures multilayer material sheets are produced which withstand a water pressure of more than 1000 Pa, preferably more than 1500 Pa on the veil-lined side without water passing through the veil. The water absorption coefficient is distinctly below $0/5 \ kg/(m^2 \sqrt{t})$. The diffusion-equivalent air layer thickness at a sheet thickness of 0.1 m is much less than 1.0. In preferable embodiments of the invention it is 0.6, more preferably 0.3 and in especially preferable cases even less than 0.2 m.

The invention is detailed below using examples.

EXAMPLE 1

A melamine resin-bonded veil of E glass fibers with a pore width between the fibers of roughly 10-100 microns is immersed in a solution of 50 g cellulose propionate in 950 g acetone for 0.5 minutes. After removal from the solution, the excess solution is allowed to drip off and some of the acetone is evaporated. After 2.5 minutes the veil is immersed in a water bath and allowed to remain there for 6 hours. Then the veil is dried for 16 hours in a drying cabinet at 40° C. The dried veil is placed on a flat metal plate onto which a frame 1 cm high is screwed. The flame is filled with a paste of plaster to which a 0.5% of a silicone waterproofing agent are added during mixing. The thin plaster is distributed in the frame by shaking. The excess amount is removed by scraping. After a setting time of one hour the frame is removed. The plasterboard is dried for 24 hours in ambient air and for another 24 hours in a drying cabinet at 40° C.

EXAMPLE 2

A melamine resin-bonded veil of E glass fibers is immersed for one minute in an aqueous polyacrylate dispersion. After removal from the dispersion some of the excess liquid is allowed to drip off. On a flat base the remaining dispersion is scraped off the veil surface on both sides. Then the veil is dried for 24 hours in a drying cabinet at 40° C. The dried veil is placed on a flat metal plate onto which a frame 1 cm high is screwed. As is described in example 1, the frame is filled with gypsum and the gypsum is dried after setting.

EXAMPLE 3

A melamine resin-bonded veil of E glass fibers is painted with a mixture of 45 g of a surface-reactive aluminosilicate powder, 55 g water glass and 5 g water (geopolymer mixture). The geopolymer mixture is uniformly distributed on the veil by rolling. The coated veil is dried for 72 hours in ambient air and another 24 hours in a drying cabinet at 40° C. The dried veil is placed on a flat metal plate onto which a frame 1 cm high is screwed. As is described in example 1, the frame is filled with gypsum and the gypsum is dried after setting.

EXAMPLE 4

To characterize the veil properties, a melamine resin-bonded veil of E glass fibers with a pressure tightness of 0 mm water column and with a pore width between the fibers of roughly 10-100 microns is immersed in a solution of ethylene-vinylacetate copolymer (concentration 5, 10 and 15% by M) and the polymer after different breathing times is caused to precipitate. At a concentration of 5% and a breathing time of 1 min, after 5 coating processes a pressure tightness of 320 mm water column was reached. At a concentration of 5%, a breathing time of 1 min and a coating process the pressure tightness was 145 mm water column. In neither case was any change of the water vapor permeability relative to the untreated veil ascertained.

In all examples the composite sheet was examined for its diffusion properties and its water repelling properties. The water vapor diffusion resistance numbers ($\mu$ value) were used as the standard for the diffusion properties in the dry range, and for the water repelling properties the water absorption coefficients (w values, $kg/(m^2 h^{-1/2})$) were used. A plaster board (thickness 0.01 m) without waterproofing agents and without a veil has a $\mu$ value of 8 and a w value (1 h) of 3.90 $kg/(m^2 h^{-1/2})$. With a conventional waterproofing agent (0.5% by M) a $\mu$ value of 8 and a w value of 0.23 $kg/(m^2 h^{-1/2})$ were determined. For a composite sheet with 0.5% waterproofing agent in the carrier sheet and a veil which has been treated as claimed in the invention, the w value was 0.03 $kg/(m^2 h^{-1/2})$ and the $\mu$ value was 9.

The invention claimed is:

1. A multilayer material comprising:
   (a) a first layer which consists of gypsum or in essential parts of gypsum,
   (b) at least one second layer, comprising a layered textile fiber material with fibers which are joined in a mechanically stable manner among one another, which are not flammable and which are weather-resistant, and its intermediate spaces are filled with a material which has fine pores, the second layer having a diffusion-equivalent air layer thickness of less than 2.0 m and being impermeable to water at a water pressure of at least 100 mm water column, wherein the material which has fine pores is selected from the group consisting of a partially or entirely an inorganic material.

2. The multilayer material as claimed in claim 1, wherein the diffusion-equivalent air layer thickness of the second layer is less than 1.0 m, preferably less than 0.2 m, and/or the layer is impermeable to water at a water pressure of at least 150 mm.

3. The multilayer material as claimed in claim 1, wherein the gypsum layer furthermore has reinforcing particles of inorganic or organic fibers or chips.

4. The multilayer material as claimed in claim 3, wherein the reinforcing particles consist of glass, stone, cellulose, lignocellulose or mixtures of these materials or contain them.

5. The multilayer material as claimed in claim 1, wherein the partially or entirely inorganic material is selected from the group consisting of a geopolymer and a material which has been produced from water glass by hardening.

* * * * *

UNITED STATES PATENT AND TRADEMARK OFFICE
CERTIFICATE OF CORRECTION

PATENT NO. : 7,399,718 B2 Page 1 of 1
APPLICATION NO. : 10/468565
DATED : July 15, 2008
INVENTOR(S) : Neumann et al.

It is certified that error appears in the above-identified patent and that said Letters Patent is hereby corrected as shown below:

Title Page:

In (22) PCT Filed, please correct the filing date to read as follows:

(22) PCT Filed: Feb. ~~22~~ 25, 2002.

IN THE SPECIFICATION
Page 1, following the title, please insert the following:
--This application is a 371 of PCT/EP02/02028 filed on February 25, 2002, the entirety of which is hereby incorporated by reference.--

Signed and Sealed this

Ninth Day of December, 2008

JON W. DUDAS
*Director of the United States Patent and Trademark Office*